(12) United States Patent
Larson et al.

(10) Patent No.: US 7,513,627 B2
(45) Date of Patent: Apr. 7, 2009

(54) IMAGE PROJECTION SYSTEM WITH VIBRATION COMPENSATION

(75) Inventors: Brent D. Larson, Cave Creek, AZ (US); Matthew B. Dubin, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 484 days.

(21) Appl. No.: 11/322,762

(22) Filed: Dec. 30, 2005

(65) Prior Publication Data
US 2007/0153241 A1 Jul. 5, 2007

(51) Int. Cl.
*G03B 21/14* (2006.01)
*G03B 21/00* (2006.01)

(52) U.S. Cl. .............................. 353/69; 353/46; 353/79

(58) Field of Classification Search .................. 353/122, 353/100, 46, 79
See application file for complete search history.

(56) References Cited

U.S. PATENT DOCUMENTS

| | | | | |
|---|---|---|---|---|
| 3,914,645 A | * | 10/1975 | Li Donnici | 315/89 |
| 4,343,539 A | * | 8/1982 | Task | 353/122 |
| 5,278,596 A | * | 1/1994 | Machtig | 353/122 |
| 5,465,127 A | | 11/1995 | Baldwin et al. | |
| 5,532,894 A | * | 7/1996 | Sweaton | 361/18 |
| 5,917,587 A | * | 6/1999 | Rando | 356/149 |
| 6,416,183 B1 | * | 7/2002 | Colpaert et al. | 353/46 |
| 7,281,807 B2 | * | 10/2007 | Plut | 353/119 |
| 2004/0262474 A1 | * | 12/2004 | Boks et al. | 248/276.1 |
| 2005/0046802 A1 | | 3/2005 | Suzuki et al. | |
| 2005/0083486 A1 | | 4/2005 | Johnson | |
| 2007/0230177 A1 | * | 10/2007 | Suzuki | 362/257 |

FOREIGN PATENT DOCUMENTS

WO 2004109737 A2 12/2004
WO 2005001562 A2 1/2005

OTHER PUBLICATIONS

European Search Report for Application No. 06126121.0, dated Apr. 17, 2007.

* cited by examiner

*Primary Examiner*—William C Dowling
*Assistant Examiner*—Danell L Owens
(74) *Attorney, Agent, or Firm*—Ingrassia Fisher & Lorenz, P.C.

(57) ABSTRACT

A projection system includes a vibration controlling structure. The projection system includes an imaging unit mounted to a movable platform via a partially compliant mount structure, such that the imaging unit is partially isolated from the platform while projecting an image which is stable with respect to the platform. The imaging unit and partially compliant mounting structures are constructed and arranged to damp vibrational forces on the imaging unit.

17 Claims, 4 Drawing Sheets

IMAGE PROJECTION SYSTEM WITH VIBRATION COMPENSATION

TECHNICAL FIELD

The present invention generally relates to optical image projection systems. In particular, the present invention relates to an image projection system for use in environments where the system is exposed to vibrations and accelerations that may interfere with projected image quality and/or misalign system components.

BACKGROUND

Image projection systems are currently used for a wide range of display applications. More often than not, projection systems are used in generally still or motionless environments such as conference rooms.

However, projection systems are subject to accelerations and vibrations in certain applications, such as flight simulators, motion tables, or avionics installations. The motions present in these applications may adversely affect the projected images. For example, image blurring caused by image defocus or simply by moving.

Further, these projection systems may be degraded by mechanical stresses such as shock, large accelerations, and vibration. For example, such stresses may degrade individual components, mountings, and interconnections in the projection systems. Even if these system elements are not degraded by mechanical stresses, the desired spatial relationships between the elements may change, degrading the display output.

One method for reducing the influence of vibrations and other potentially deleterious forces on a projection system is to isolate the system from these sources by, for example, mounting the components using available cushioning supports. However, for projection displays (and other types of relatively complex optical devices) simple cushioning of the components may result in other potentially undesirable effects.

The individual cushion-mounted components may shift relative to each other when subjected to vibration, thereby degrading image quality. For instance, a relative shift of an image source and a projection lens may cause image defocus or other undesirable effect. In addition, differential vibration between components may blur the image through repeated loss of focus or by actual movement of the image on the screen.

If the complete projection system vibrates, the projected beam may vibrate in a way that amplifies the apparent vibration due to the system projection geometry. This amplification factor can be quite large, depending upon the type of motion and the geometry of the system.

Yet another concern with many projection systems is the ability of the individual components comprising the system to resist mechanical stress. Here too, some designs isolate the complete system from mechanical stress. While this might be practical for small systems, it is less workable for larger systems. Furthermore, it also raises the concern that the system "floats" or vibrates relative to the structures holding it. This motion may be acceptable in some scenarios, but often is not acceptable when the projected image must be stable with respect to a specified reference structure.

Another prior art method for protecting projection systems from vibration is to remove the systems from the source of vibration or acceleration completely, as can be found in U.S. Pat. No. 4,343,539. Such a method is significantly limited in applicability, however, as the projection display system is not self-contained and cannot be fully mounted on or within the moving platform such as a vehicle or motion table. Further, the approach does not accommodate arbitrary platform motion as would be necessary for general-purpose use.

The present invention addresses the needs expressed above, as well as other problems associated with existing projection display systems. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides an image projection system having a vibration controlling structure. The system generally comprises an imaging unit and a reference structure, wherein the imaging unit is partially isolated from the reference structure. The imaging unit is mounted to the reference structure by partially compliant mounting means. The partially compliant mounting means are compliant along at least one mechanical degree of freedom and substantially rigid or non-compliant along at least one other mechanical degree of freedom. Additionally, the imaging unit is constructed and arranged to damp vibrational forces and other forces associated with motion of a common platform to which the imaging unit is mounted, and which provides the reference frame or structure for stability of the displayed image. The reference structure may contain an image receiving unit which further acts upon the image delivered by the imaging unit.

In one embodiment, and by way of example only, a projection system for forming an image includes a movable reference structure, an imaging unit, and a mount structure. The imaging unit is configured to provide a light beam carrying an image. The mount structure couples the imaging unit to the movable reference structure, and is at least partially compliant.

The aforementioned benefits and other benefits including specific features of the invention will become clear from the following description by reference to the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION OF PREFERRED EMBODIMENTS

Figure 1:
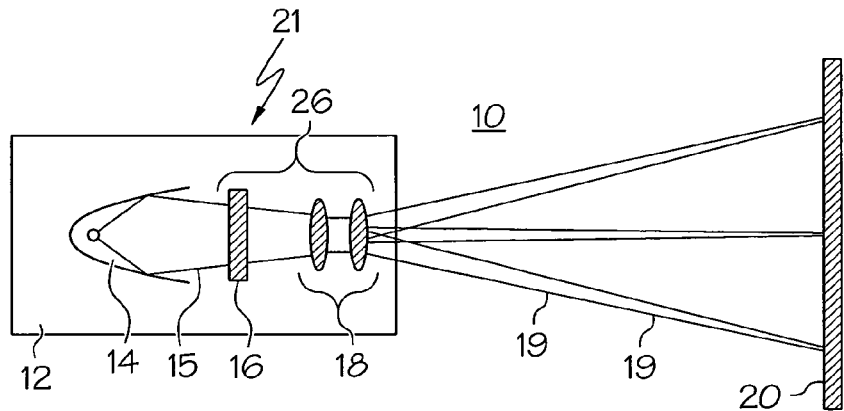
FIG. 1 is an overhead perspective view of a typical image projection system.

The following detailed description of the invention is merely exemplary in nature and is not intended to limit the invention or the application and uses of the invention. Furthermore, there is no intention to be bound by any theory presented in the preceding background of the invention or the following detailed description of the invention. Moreover, in the drawings, like reference numerals denote like elements throughout the several views. Several drawings in this description show side section views of optical projection systems. In an actual system constructed according to usual practice, additional mounts or brackets solidly attach each optical component to the housing or subassembly that encloses them. For convenience these mounts are not shown.

FIG. 1 illustrates a typical prior art projection display system 10. System 10 generally comprises a projector 21 having an illuminating element 14 and projection optics 26. Illuminating element 14 generates a light beam 15 shown with representative rays shown passing through projection optics 26.

The projection optics 26 include an image generator 16 forming therein an image pattern, and a projection lens structure 18 which cooperate to generate modulated rays 19. Rays 19 project onto a viewing screen 20 to form an image recreating the image pattern of image generator 16. The projector 21 components 14, 16, and 18 are supported by a housing 12 or other such support or chassis structure in a spaced relation to each other and to screen 20 as shown. The image formed by generator 16 may be fixed or may be electronically alterable. Projector 21 and screen 20 are all mounted on a non-illustrated frame. The mounting may be rigid, or projector 21 and screen 20 may be shock-mounted.

Many common projector designs include additional components that, for example, provide multiple light paths for multiple colors. These additional components are not shown in FIG. 1, since the invention can be fully described and enabled without this added description.

Figure 2:
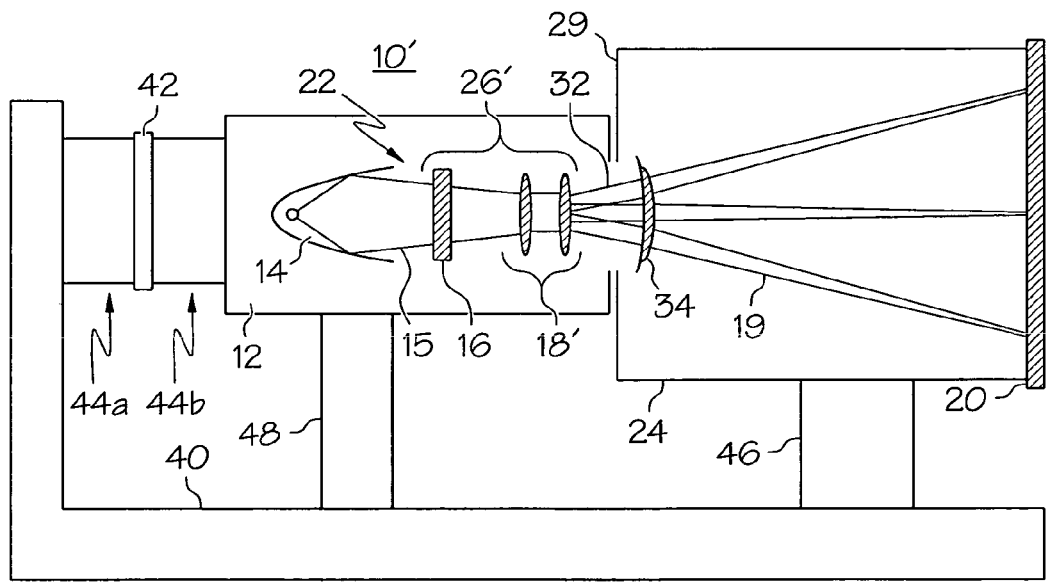
FIG. 2 is an overhead perspective view of an embodiment of a projection display system of the present invention.

A simplified version of the present invention is shown in FIG. 2 as a projection display system 10' mounted on a base plate 40. Projection display system 10' includes an imaging unit 22 mounted in a housing 12 and which provides the functionality of the projector 21 of FIG. 1. A display unit 24 is mounted on base plate 40 by a rigid bracket 46 and receives and displays an image projected by imaging unit 22.

System 10' is designed to compensate for blurring of the image resulting from mechanical movements that may be typically imposed on base plate 40 from an external source. Reduced blurring of this image results from special features of imaging unit 22 and a specialized mechanical coupling of imaging unit 22 to base plate 40.

Display unit 24 includes a screen 20 onto which imaging unit 22 projects an image having reduced blurring caused by vibration of base plate 40. Display unit 24 has focusing optics 34 receiving the image from imaging unit 22 and projecting the image on screen 20. The components of the display unit 24 are rigidly fixed relative to each other. Vibration of these components does not greatly affect the clarity of the projected image.

Usually, the focusing optics 34 will comprise a number of lenses rather than a single lens as shown. Optics 34 refract the collimated beam 32 to form a focused beam 19 that recreates on viewing screen 20 the image, in focus and enlarged, formed in image generator 16. Optics 34 are of the type that refracts beam 32 to the same area of screen 20 whether beam 32 is centered on optics 34 or not, so long as the beam 32 angle with respect to optics 34 is unchanged.

In the FIG. 2 device, display unit 24 forms at least a part of a reference structure to which imaging unit 22 is stabilized. Imaging unit 22 provides an image that is stabilized relative to the reference structure as a result of specialized, damped motion by the imaging unit 22 in response to vibration of system 10'. A viewer's support will typically be a part of the reference structure. Imaging unit 22 includes an illuminating element 14 and an image generator 16, both similar to that of FIG. 1. Imaging lenses 18' refract light rays 15 produced by illuminating element 14 and modulated by image generator 16 to produce a collimated light beam 32 aimed at focusing optics 34. The term "collimated" here means only that the beam 32 focuses at infinity, or at least at a distance many times greater than the Y and Z beam widths as shown in FIG. 2. The image generator 16 and imaging lenses 18' comprise imaging optics 26'.

In FIG. 2 the imaging unit 22 is mounted to the base plate 40 by a pair of generically illustrated single degree of freedom of motion (SDFM) units 44a and 44b. A coupling plate 42 connects SDFM unit 44a in series with SDFM unit 44b. Imaging unit 22 is supported by the SDFM units 44a and 44b in a position such that light beam 32 is projected through focusing optics 34 to screen 20.

A SDFM unit is a mechanical device that mounts an element on a frame or other support and allows either translation or rotation of the mounted element along or about a single axis with respect to the frame. An SDFM unit strongly resists any other type of motion by the mounted element with respect to the frame. SDFM units 44a and 44b can have any of a number of different structures, but typically will be similar to each other.

Normally for the device of FIG. 2, the axis for each of the serially connected SDFM units 44a and 44b will be one of the orthogonal X, Y, and Z axes shown in FIG. 2 but this is not necessary. However, the axes of SDFM units 44a and 44b should normally not be identical. The series-connected SDFM units 44a and 44b form at least a part of the support for imaging unit 22 to attach imaging unit 22 to base plate 40. Examples of suitable alternative SDFM unit structures are shown in FIGS. 5-8.

In the FIG. 2 configuration, SDFM unit 44a allows coupling plate 42 to translate only along the Y-axis with respect to base plate 40. SDFM unit 44b allows imaging unit 22 to translate only along the Z-axis with respect to coupling plate 42. Thus, SDFM units 44a and 44b cooperate to restrict movement of imaging unit 22 to only translate along the Y and Z-axes.

SDFM units 44a and 44b support imaging unit 22 with a physical space or gap 29 between imaging unit 22 and display unit 24. Gap 29 prevents direct mechanical connection or contact between unit 22 and display unit 24. Gap 29 may be very short, but should prevent mechanical movement such as vibration acting on base plate 40 from directly transferring to imaging unit 22.

Space or gap 29 is one type of an optical and mechanical interface between display unit 24 and imaging unit 22 that is hereinafter referred to as an "optical link". An optical link in this context allows the collimated light beam 32 from an imaging unit, such as imaging unit 22, to project into a display unit, such as unit 24, without directly transmitting mechanical forces, such as may be caused by vibration, between the imaging unit 22 and display unit 24.

The gap 29 forming the optical link is preferably an air space, but could include other light transmitting media such as glass, liquids or even vacuum. If the optical link is implemented as a transparent solid, the imaging unit 22 is preferably mechanically isolated from display unit 24.

While SDFM units 44a and 44b of FIG. 2 are of the type allowing translation along the Y and Z-axes respectively, other types and numbers of SDFM units may be used. The invention can function with anywhere from one to five SDFM units of various types depending on the particular requirements of the installation and the types of vibration expected.

Imaging unit 22 may undergo large displacements if supported only by SDFM units 44a and 44b. A damping means 48 placed between imaging unit 22 and base plate 40 limits these displacements. Damping means 48 reduces the displacement of imaging unit 22 and damps vibrational force transmitted to imaging unit 22 through SDFM units 44a and 44b.

When base plate 40 is subjected to vibration, SDFM units 44a and 44b allow the imaging unit 22, including the imaging lenses 18' of the imaging optics 26', to move in translation only along the Y- and Z-axes relative to the base plate 40. The characteristic of focusing optics 34 to direct the collimated beam 32 to the same area on screen 20 regardless of minor changes in the Y and Z position of the collimated beam 32 substantially reduces the movement of the image created on screen 20 and reduces or at least substantially eliminates blurring of the image.

Since the image provided to the focusing lens 34 is collimated in this embodiment, the location of the focused image on the projection screen 20 is independent (for small vibrations or an ideal focusing lens) of the X, Y, and Z positions of the imaging unit 22. For this reason, structure of device 10' reduces the effects of translational forces on the imaging unit 22 and its various components. A third SDFM, allowing relative motion in the Z direction could be added as well.

In the present embodiment, the focusing optics 34 is rigidly connected to the projection screen 20 and any intermediate mirrors. Normally, this is easy to do. However, it is often the case that some relative motion can be more readily tolerated than other relative motions. Once the image is magnified by the imaging unit 22 and the focusing optics 34, some screen motion may be acceptable without significantly degrading the image, allowing the screen to be mounted in a compliant manner such as with a flexible adhesive. In this case, the focusing optics 34 serve as both the reference structure and the image receiving unit.

The SDFM units used can be conventional components, such as stacked single axis stages incorporating crossed roller bearings, or bearings on a shaft or rail. Since large excursions are not likely to be needed, simpler structures, such as spring flexures or other linkages, may also be feasible.

The SDFM units 44a and 44b used in the embodiment shown in FIG. 2 only isolate imaging unit 22 from translational vibration, but not from rotational vibration. For such types of vibration, other types of SDFM units may be used as well. For example, a rotational SDFM unit with a Y- or Z-axis of rotation in general alignment with screen 20 would create a situation where only the edges would come slightly out of focus, depending on the spacing of screen 20 from imaging unit 22. In this case, it is preferable that the focusing function of optics 34 be included in imaging unit 22. If screen 20 is relatively far from imaging unit 22 and the Y- and Z-axes are in screen 20, then Y-axis and Z-axis rotation is equivalent to Z-axis and Y-axis translation respectively.

In general, if vibratory modes, i.e., translational vibration along particular axes or rotational vibration around particular axes, are expected for a system 10', the SDFM units used to support imaging unit 22 should duplicate those vibratory modes. For example, the SDFM units 44a and 44b shown in FIG. 2 suggest that the expected vibratory modes that system 10' will experience are translational vibrations along the Y- and Z-axes.

Another factor for selecting the types of SDFM units for supporting imaging unit 22 is the structure of imaging unit 22. Some vibratory modes may degrade or misalign a particular optical system more severely than others. In such cases, one may select the SDFM units to match these optical system characteristics. For example, the Y- and Z-axes SDFM units 44a and 44b will reduce translational accelerations experienced by imaging unit 22 along the Y- and Z-axes. If translational accelerations along these axes are more likely to degrade or misalign imaging unit 22 than X axis acceleration or rotational vibratory modes, then the SDFM units of FIG. 2 are best suited for system 10'.

If no factor suggests particular types of SDFM units, then one may simply assume a number of common vibratory modes and use SDFM units that compensate for these vibrations.

Damping means 48 damps and limits displacements by the imaging unit 22 from base plate 40 by SDFM units 44a and 44b, relative to display unit 24 resulting from vibrations or shock transmitted to imaging unit 22 by base plate 40. This vibration or shock may result from, for example, vibration or shock that base plate 40 experiences. Damping means 48 may comprise any one of numerous types of resilient damping materials, such as solid polymeric material. One such damping material is a polymer sold under the trade name SORBOTHANE®. The damping means 48 may have various configurations. The damping means 48 may be connected between imaging unit 22 and base plate 40 as shown, but may alternatively be incorporated into SDFM units 44a and 44b.

The image produced by focusing optics 34 may be viewed on a projection screen 20 as shown in FIG. 2 or may be beamed at another display device such as an imaging detector, or alternately it may be collimated by subsequent optics. For example, a real imager relay provided via a screen can be very useful in a collimated system. In such a scheme of subsequent collimation, the image on the screen is preferably coupled closely to the rest of the collimating optics. The optical arrangement between focusing optics and the subsequent optics may of course include additional SDFMs if appropriate.

Figure 4:
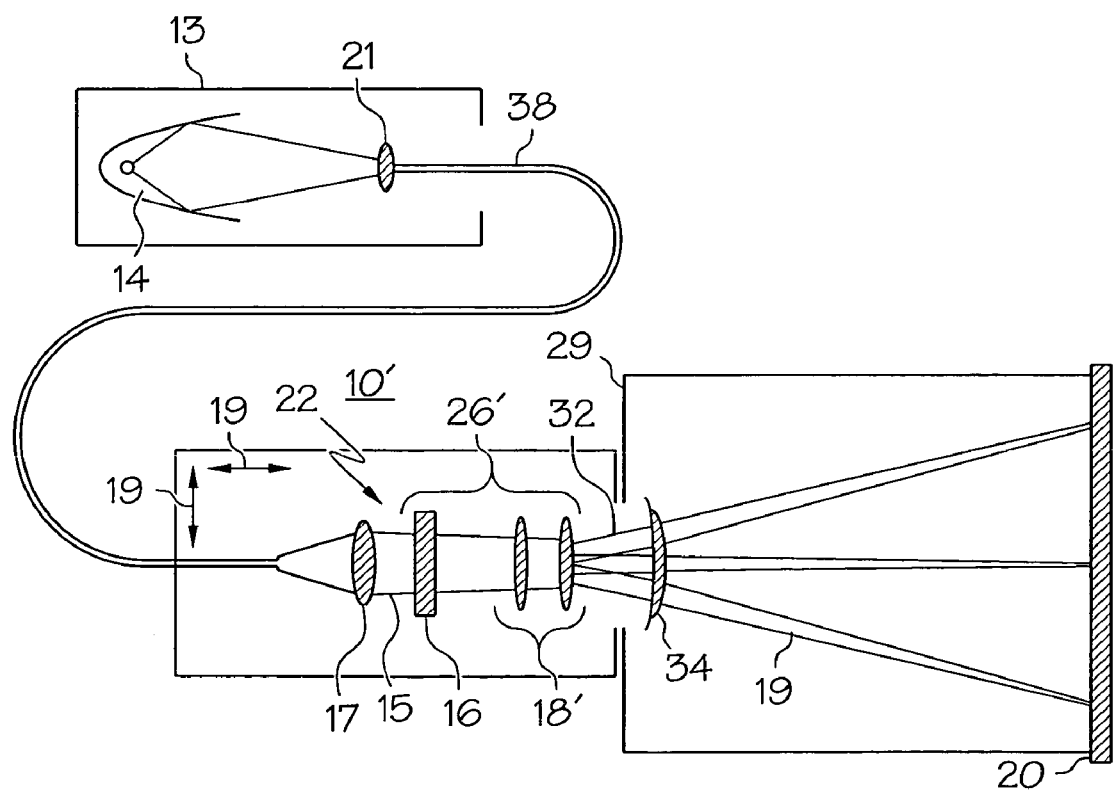
FIG. 4 is an overhead perspective view of another embodiment of a projection display system, of the present invention having a decoupled illuminating element.

FIG. 4 shows a structure for providing additional protection for a potentially fragile illuminating element 14. Element 14 is mounted in an auxiliary housing 13 along with a focusing lens 21 mounted to receive light provided by element 14. A first end of a flexible light pipe 38 is mounted to receive light from element 14 and is focused by lens 21. Light pipe 38 transmits light to a further focusing lens 17 mounted in an imaging unit 22' similar to the imaging unit of FIG. 2. Focusing lens 17 then directs the light beam to image generator 16, and from that point the system construction in FIG. 4 is very similar to that of FIG. 2.

Figure 3:
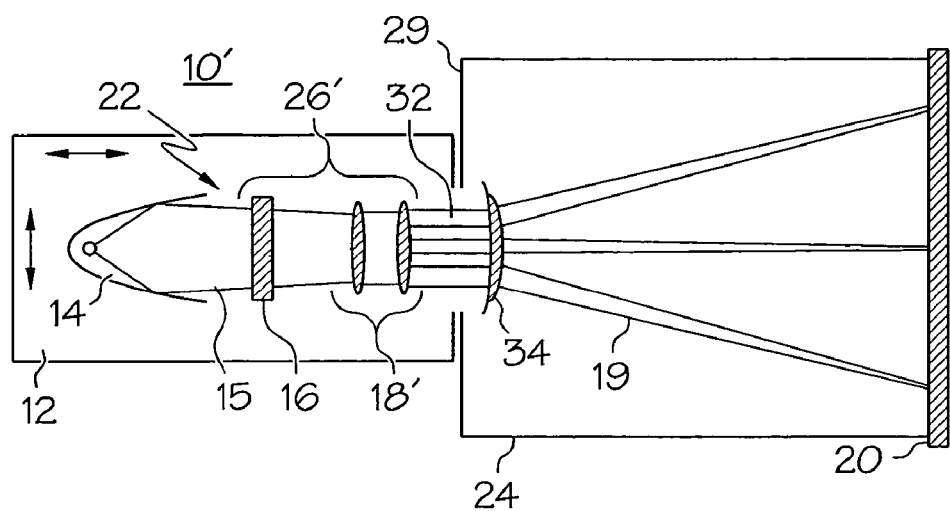
FIG. 3 is an overhead perspective view of the embodiment of FIG. 2.

Other vibration-tolerant coupling methods are also possible. For example, one suitable structure exists wherein the aperture of the light valve is overfilled by direct illumination. FIG. 3 provides a suitable framework for the use of this method, provided the illumination spot incident from illuminator 14 on image source 16 is larger than the active area of image source 16. The method can be useful especially when the illuminating element 14 is mounted to a separate vibration isolator instead of directly to the motion platform on which the light valve and other projection optics are mounted. Some amount of relative motion of illuminating element 14 can then be tolerated as long as light still passes effectively through the rest of the system.

Additionally, illumination into a collector such as a light pipe or uniformizing, light mixing bar can provide other vibration-tolerant coupling methods. With respect to these structures, the input from illuminating element 14 to the collector can be either over filled or under filled. In the over filled case, illuminating element 14 forms an illumination spot, or image, which is larger than the input to the collector. In the under filled case, the image formed by the illuminating element 14 is smaller than the collector input.

Another technique which can further relax the strict relational coupling of the system is to utilize a telecentric collimating projection lens as lens 18'. In this case, the size and location of the projected image is insensitive to small variations (within the depth of focus) in the distance from the light valve to the lens. The use of this structure may allow further simplification of the platform mechanical design, since small variations in the distance between elements 16 and 18' of FIG. 2 may then be tolerated.

Figure 5:
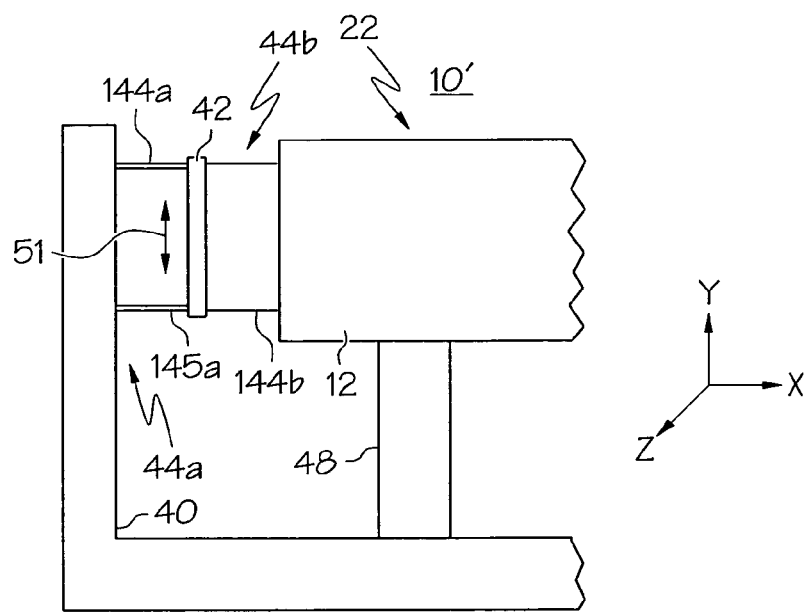
FIG. 5 is a view of one embodiment of a mounting method of the present invention.
Figure 6:
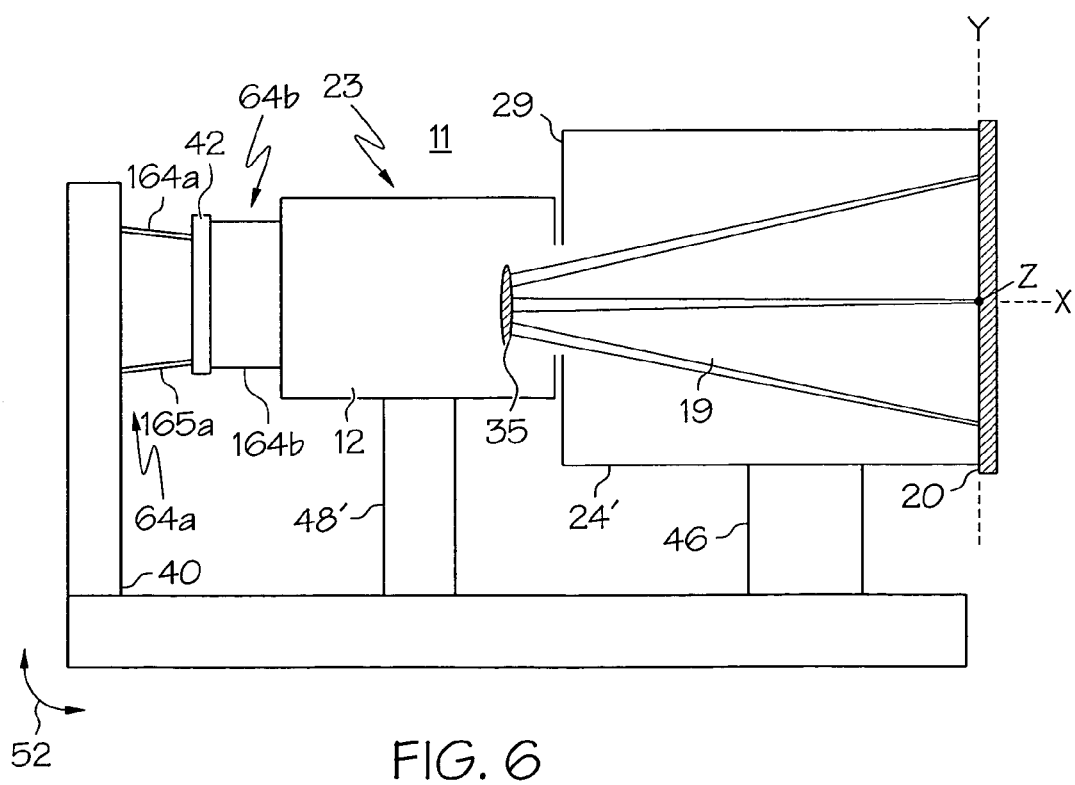
FIG. 6 is a view of another embodiment of a mounting method of the present invention.

FIG. 5 shows one possible structure for Y- and Z-axes translational SDFM units 44a and 44b of FIG. 2 that mount the imaging unit 22 to the base plate 40. For ease of understanding, the three axes are shown three-dimensionally in the axis indicator although the Z-axis for both FIGS. 5 and 6 is normal to the paper.

SDFM unit 44a in FIG. 5 comprises two flexible, parallel, substantially identical planar sheets or plates 144a and 145a connecting coupling plate 42 to base plate 40, and shown on edge in FIG. 5. Plates 144a and 144b are fixedly attached along their edges to coupling plate 42 and base plate 40. Sheets 144a and 145a are formed of a material such as stainless steel and have a shape and dimensions strongly resisting compression or extension along the X-axis. Sheets 144a and 145a should, however, bend elastically near their attached edges along the Z-axis of FIG. 5 to allow coupling plate 42 to shift in the Y-axis direction as indicated by double-ended arrow 51.

Parallel sheets 144a and 145a are attached between base plate 40 and coupling plate 42 to support projection unit 22. Sheets 144a and 145a form a conventional four bar parallelogram linkage. Since sheets 144a and 145a are substantially identical and are parallel to each other, coupling plate 42 will, for small Y-axis displacements, translate with almost no rotation mainly along the Y-axis and a small distance along the X-axis that can usually be ignored. A more detailed flexure analysis predicts similar behavior of parallel sheets 144a and 145a.

SDFM unit 44b attaches imaging unit 22 to coupling plate 42. SDFM unit 44b construction is essentially identical to the construction for SDFM unit 44a, but is rotated 90° about the X-axis relative to SDFM unit 44a. For this reason, only sheet 144b of SDFM 44b is visible with the large surface thereof facing the viewer. A second identical sheet is hidden behind sheet 144b and not visible to the viewer. Both sheets comprising SDFM unit 44b may be identical to those of SDFM unit 44a and may have connections to coupling plate 42 and imaging unit 22 identical to those of SDFM units 44a to base plate 40 and coupling plate 42.

For small displacements of imaging unit 22, SDFM unit 44b allows imaging unit 22 to translate only along the Z- and X-axes relative to coupling plate 42 with almost no rotation of imaging unit 22. Thus sheet 144b and the hidden sheet together form the Z-axis translational SDFM unit 44b.

When subjected to linear vibrations along the Y- and Z-axes, imaging unit 22 as supported in FIG. 5 will mainly translate along the Y- and Z-axes, with slight translation in the X-axis direction. Since beam 32 is collimated, the translation along the X-axis does not affect the focus of the image projected onto screen 20. Damping means 48 again limits total excursions of imaging unit 22.

FIG. 6 shows a system 11 suitable for reducing blurring caused by rotational vibration of base plate 40. Rotational vibration about the Z-axis is represented by curved double arrow 52. The Z-axis is shown in FIG. 6 as a small dot on the surface of screen 20. Similar rotational vibration may occur about the Y-axis is shown as a dotted line on the surface of screen 20. The X-axis is also shown as a horizontal dashed line.

An image is considered a virtual image when the light corresponding to a given point in the source is either collimated or diverging. If the light from a given point in the source is converging, it is said to form a real image. In the case of a diverging or converging image, it is desirable to have the imaging unit 22 rotate about the center of the virtual or real image thus defined. This can be done by providing a SDFM with partial rotational compliance instead of translational compliance. The embodiment depicted in FIG. 6, which will now be described, provides such rotational compliance.

In FIG. 6, a projector 23 within housing 12 comprises the various image generation and optical elements (generally represented by lens 35) for producing a converging, real image beam 19. Display unit 24' of this embodiment does not include any of the image-generating optics, having only the conventional screen 20 similar to that present in FIG. 2. Base plate 40 supports display unit 24' with a bracket 46 functionally identical to that of FIG. 2. Base plate 40 is the reference structure, and display unit 24' and included screen 20 serve as the image receiving unit.

Imaging unit 23 is supported on base plate 40 by SDFM units 64a and 64b and the damping means 48. The SDFM units 64a and 64b in system 11 differ in some ways from the SDFM units 44a and 44b in FIGS. 2 and 5 that support imaging unit 22, but also have some similarities.

SDFM units 64a and 64b are very similar components. SDFM unit 64a comprises first and second flat, flexible plates or sheets 164a and 165a oriented perpendicular to the X-Y plane, i.e., the plane of the paper. Edges of plates 164a and 165a are fixed to base plate 40 and to coupling plate 42. Plates 164a and 165a are designed to flex adjacent to base plate 40 and coupling plate 42, allowing SDFM unit 64a to function as a four-bar linkage. In these respects, SDFM unit 64a is similar to SDFM unit 44a of FIG. 5.

Plates 164a and 165a are angled with respect to each other to form, in the X-Y plane, the non-parallel sides of a regular trapezoid. This geometry allows SDFM unit 64a to constrain motion of projector 23 to a simulated rotation of projector 23 about the Z-axis of FIG. 6. The four-bar linkage formed by sheets 164a and 165a; base plate 40, and coupling plate 42 allows lens 35 to rotate about the Z-axis. SDFM units 64a and 64b do not cause lens 35 to precisely rotate about the Z-axis but the motion is sufficiently accurate to substantially improve the perceived image. Four-bar linkage analysis is well known in mechanical design so no further analysis should be necessary.

The design of SDFM units 64a and 64b should be selected to provide rotational motion about the portion of the screen 20 with the most critical data. This is often the center of the screen, but that is not a requirement. This will result in an image that is rotating in and out of the plane of the screen. In the region around the point of rotation, the displacements will be very small and no visible degradation will be present. By providing the appropriate damping it is possible to keep the defocus of the image within the depth of focus for normal operation. During abnormal accelerations, parts of the image will become defocused, but the delicate components in imaging unit 23 will be protected from high accelerations.

The present invention is not restricted to projection of an image from a light valve, but can be applied to any image projection, such as the spot from a illuminating element. If protection of the illuminating element 14 is required and it cannot be remotely located, these techniques can also be applied to allow partial compliance to be included in the coupling between the illuminating element 14 and the reference structure which receives the spot or image from the illuminating element 14. In the prior descriptions, this image receiving structure comprises the rest of the components in the imaging unit 22. Many illuminating elements 14 of interest form images of the light source. The image could be located at infinity or it could be located at a finite distance from illuminating element 14. This could be accomplished by using a parabolic or elliptical reflector. If the illuminating element 14 forms an image it is desirable to have any motion be rotation about this image. In the case of collimated light, the rotation is about a point at infinity and it is the special case of linear motion. The methods described for providing partially compliant motion of imaging unit 22 can be used on the illuminating element 14 or any similar source of a projected image. The illuminating element 14 can move with respect to the imaging unit 22 regardless of any motion between the imaging unit 22 and the projection unit 26.

Figure 7:
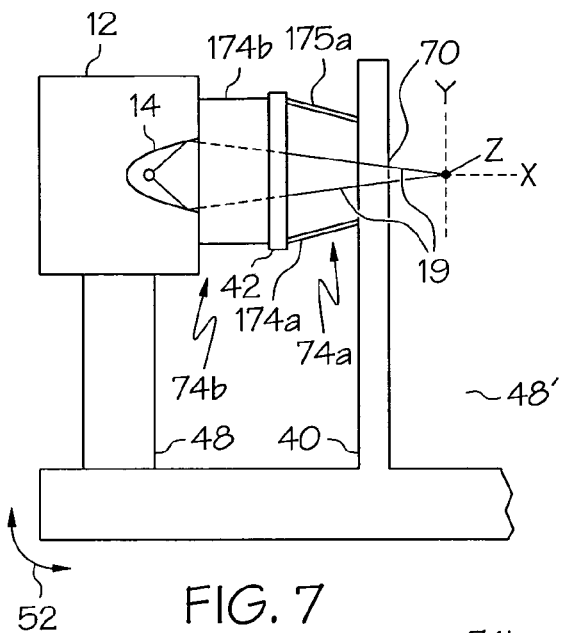
FIG. 7 is a view of an embodiment in which an illuminating element is mounted in a partially compliant manner.
Figure 8:
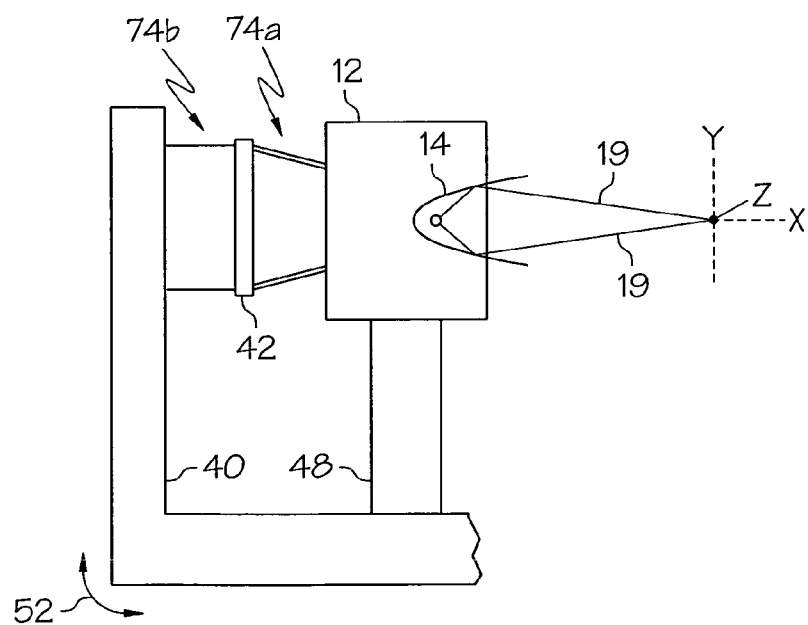
FIG. 8 shows yet another embodiment of the present invention.

If the necessary partial compliance is rotation about a finite point, this can be accomplished in a number of ways, two of which are shown FIGS. 7 and 8. Each shows damping means 48 to limit the displacement of the housing 12.

FIG. 7 shows a focusing illuminating element 14 can be supported as an independent imaging unit and be mounted in a partially compliant manner. The SDFM units 74a and 74b are selected so that the illuminating element 14 rotates about the image of the source. FIG. 7 shows non-parallel spring sheets 174a, 175a, and 174b similar to those shown in FIG. 6. Light rays 19 pass through apertures in coupling plate 42 and frame 40. Frame 40 is shown with aperture 70. Any suitable SDFM units could be used. The case of a collimated illuminating element 14 can be thought of as a limiting case of FIG. 7, where the image forms at infinity. In this case, SDFM units 74b and 74a can comprise parallel sheets.

FIG. 8 shows another configuration for mounting illuminating element 14 in a partially compliant manner. SDFM units 74a and 74b are located on the opposite side of the illuminating element 14.

Figure 9:
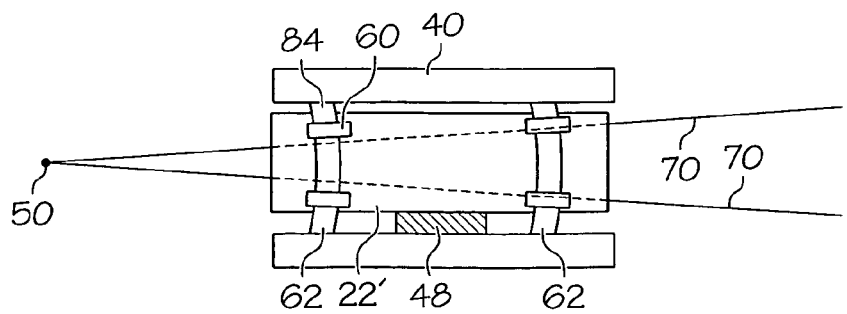
FIG. 9 shows another embodiment of the present invention.

FIG. 9 shows another embodiment of the present invention. The imaging unit 22' is a virtual image display intended for viewing by an observer. As in the embodiment of FIG. 2, base plate 40 serves as the reference structure with respect to which the displayed image is desired to be stable. Base plate 40 is suitable for mounting to an associated support structure, such as a moving platform such as a motion simulator, vehicle or similar structure where an observer is located. The projection unit 24 of FIG. 2 and its contained screen 20 are not present in this embodiment, although the eye of the observer at the right, not shown, serves an analogous role as an image receiver. Output rays 70 represent a single point on the image source, not shown, contained within imaging unit 22'. While a focused image is not provided by output rays 70 other than on the observer's retina, the situation is much the same as previous embodiments in the sense that the objective of the invention is to provide an image which is stabilized relative to the reference structure, base plate 40, while allowing damped motion of the imaging unit 22'.

The projected image output from imaging unit 22' in FIG. 9 contains a virtual or apparent origin point 50, at which the image appears to the observer to focus. To stabilize this virtual image with respect to the reference structure and base plate 40, the present invention provides for partially compliant mounting structures that allow the imaging unit to rotate about virtual position 50. The mounting structures consist of bearings 60 that slide on guides 62. Guides 62 each form the arc of a circle centered at origin point 50. While bearings 60 sliding on guides 62 are preferred for the mounting structures other forms of mounts such as those forms previously described may be used. These other forms may include as examples, flexures, bearings, tracks or the like. Damping means 48 attenuate the forces on the imaging unit 22'.

In one specific example of the embodiment of FIG. 9, the virtual point 50 is very distant from the imaging unit 22'. In such a case, imaging unit 22' produces a collimated image. The present invention is particularly relevant in this case, in which it is often desirable that the viewed image be not only stable with respect to base plate 40, but conformal with a known coordinate system as well. In this case, the mounting structures can translate rather than rotate.

It should be noted that while the figures show a rather simple transmissive projection engine, the techniques are generally applicable to single or multiple light valve systems, transmissive or reflective systems, etc. The techniques are also applicable to projectors utilizing cathode ray tubes (CRTs) or other emissive image sources in place of an illuminating element and light valve combination. The techniques may also be used with projection systems which project a simple image such as a spot or single beam of light.

Whereas the embodiments described herein contain at least one SDFM unit, this is intended to include systems having comparable functionality as provided by multiple degree of freedom of motion (MDFM) units. Examples of MDFM structures include, but are not limited to, flexible rods, parallel plates or roller structures with maintained contact between elements, ball and socket joints, and rods in cylindrical sleeves.

Since many possible embodiments may be made of the present invention without departing from the scope thereof, it is to be understood that all matter herein set forth or shown in the accompanying drawings is to be interpreted in the illustrative and not limiting sense.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A projection system for forming an image, said projection system for minimizing the effects of vibration on the appearance of the image, comprising:

a) a movable reference structure;

b) an imaging unit mounted to the movable reference structure and configured to supply a light beam carrying an image; and c) a mount structure mounting the imaging unit to the movable reference structure, the mount structure being at least partially single degree of freedom of motion (SDFM) compliant, the mount structure comprising:
   a coupling plate,
   a pair of SDFM units connected in series with the coupling plate and disposed between the imaging unit and the movable reference structure, and
   damping means coupled between the imaging unit and the movable reference structure.

2. The system according to claim 1, wherein said imaging unit comprises an illuminating element and projection optics.

3. The system according to claim 2, wherein the projection optics comprise a light valve and a plurality of lenses.

4. The system according to claim 3, wherein the plurality of lenses are constructed and arranged to collimate an image.

5. The system according to claim 3, further comprising a projection unit mounted to said movable reference structure.

6. The system according to claim 5, wherein said projection unit comprises focusing optics and a projection screen, said focusing optics and projection screen being fixed in relation to each other.

7. The system according to claim 1, wherein said mount structure is compliant in a first degree of freedom and non-compliant in a second degree of freedom.

8. The system according to claim 7, wherein said first degree of freedom is a translational degree of freedom.

9. The system according to claim 7, wherein said first degree of freedom is a rotational degree of freedom.

10. The system according to claim 2, wherein said illuminating element is isolated from said projection optics.

11. The system according to claim 2, wherein said illuminating element is isolated from said projection optics and is damped from torsional vibrations.

12. The system according to claim 2, wherein said illuminating element is isolated from said projection optics and wherein a flexible optical coupling is utilized to transmit illumination from said element to said projecting optics.

13. The system according to claim 1 wherein said image is a real image.

14. The system according to claim 1 wherein said image is a virtual image.

15. The system according to claim 1 wherein said image is a collimated image.

16. The system according to claim 1 wherein at least one of the SDFM units comprises one or more spring flexures.

17. A projection system for forming an image, said projection system for minimizing the effects of vibration on the appearance of the image, comprising:
   a) a movable reference structure;
   b) an imaging unit mounted to the movable reference structure and configured to generate an image having a virtual origin point at which the image appears to an observer; and
   c) a mount structure mounting the imaging unit to the movable reference structure, the mount structure being at least partially compliant, the mount structure comprising:
      a plurality of guides coupled to the movable reference structure, each guide forming an arc of a circle centered at the virtual origin point,
      a bearing slidingly mounted on each guide and coupled to the imaging unit, and
      damping means coupled between the imaging unit and the movable reference structure.

* * * * *